United States Patent [19]

Behl et al.

[11] Patent Number: 4,696,103

[45] Date of Patent: Sep. 29, 1987

[54] METHOD OF MAKING A ROTATING DISK ELECTRODE

[75] Inventors: Wishvender K. Behl, Ocean, N.J.; Der-Tau Chin, Winthrop, N.Y.

[73] Assignee: The United States of America as represented by the Secretary of the Army, Washington, D.C.

[21] Appl. No.: 937,804

[22] Filed: Dec. 4, 1986

[51] Int. Cl.[4] .......................................... H01R 43/00
[52] U.S. Cl. .................................. 29/825; 204/290 R
[58] Field of Search ................. 29/825; 204/198, 212, 204/290 R

[56] References Cited

U.S. PATENT DOCUMENTS

| | | | |
|---|---|---|---|
| 3,285,844 | 11/1966 | Hallsworth et al. | 204/290 R X |
| 4,394,238 | 7/1983 | Golimowski et al. | 29/825 X |
| 4,413,408 | 11/1983 | Riggs, Jr. | 29/825 |

Primary Examiner—Howard N. Goldberg
Assistant Examiner—Carl J. Arbes
Attorney, Agent, or Firm—Sheldon Kanars; Jeremiah G. Murray; Roy E. Gordon

[57] ABSTRACT

A rotating disk electrode of a soft alkali metal reactive to oxygen and moisture in the air is made from a stainless steel core, a tubular Teflon sheath, a circular disk electrode of the soft alkali metal, a self-tapping stainless steel screw to secure the soft alkali metal electrode and a steel spring to provide electric contact to the soft alkali metal electrode.

4 Claims, 2 Drawing Figures

METHOD OF MAKING A ROTATING DISK ELECTRODE

The invention described herein may be manufactured, used, and licensed by or for the Government for governmental purposes without the payment to me of any royalty thereon.

This invention relates in general to a method of making a rotating disk electrode of a soft alkali metal reactive to oxygen and moisture in the air and in particular to a method of making a rotating lithium disk electrode.

BACKGROUND OF THE INVENTION

Soft alkali metals as for example, lithium, sodium and the like, are extremely reactive to oxygen and moisture in the air. Under the normal atmospheric conditions, it has not been possible to machine these soft alkali, metals with a power tool. Thus, for example, there has been no account heretofore of successfully fabricating a rotating lithium disk electrode for studying the electrochemical reactions of lithium batteries.

This is important as it would be desirable to improve the performance of the lithium anode in secondary lithium batteries electrode would provide well defined hydrodynamics and mass transfer conditions and might be used to determine the transport and kinetic properties of the lithium electrode reactions during the charge and discharge cycles. The information that can be examined by the rotating lithium disk electrodes includes: the reaction rate constants, reaction order, exchange current density, Tafel slopes and diffusion coefficients of lithium salts ($LiAsF_6$, $LiClO_4$, $LiAlCl_4$, etc.). These parameters are useful in the design of the lithium batteries and in predicting their charge/discharge capabilities.

SUMMARY OF THE INVENTION

The general object of this invention is to provide a method of fabricating a rotating disk electrode of a soft alkali metal reactive to oxygen and moisture in the air. A particular object of this invention is to provide a method of fabricating a rotating lithium disk electrode.

It has now been found that the aforementioned objects can be attained by constructing the rotating lithium disk electrode from a stainless steel core, a tubular Teflon sheath, a circular lithium disk electrode, a self-tapping stainless steel screw to secure the lithium electrode, and a steel spring to provide electric contact to the lithium electrode.

More particularly, according to the invention, the fabrication procedure first involves the machining of the stainless steel core and the tubular Teflon sheath. The top end of the stainless steel core is machined to fit into the shaft of a high speed rotator. The bottom end of the stainless steel core contains the self-tapping screw, and is pressure-fitted into the Teflon sheath. The unit is then brought into a dry box having a dry and inert argon atmosphere. A short section of coiled steel spring is then placed into the opening of the Teflon sheath. A lithium rod with its diameter slightly smaller than the inside diameter of the Teflon sheath and its length slightly longer then the depth of the opening, is inserted into the Teflon sheath. The insertion process involves the rotation of the lithium rod to force the self-tapping screw to thread into the lithium rod. The insertion process continues until the steel spring is sufficiently compressed against the stainless steel core. The ohmic resistance between the stainless steel core and the inserted lithium rod is measured with a multimeter to ensure that a good electric contact is provided to the rotating lithium disk electrode. The bottom end of the Teflon sheath containing a small amount of excess lithium is then placed into the cavity of an aluminum electrode holder. The entire unit is then pressed axially until the lithium expands to completely fill the opening of the Teflon sheath.

The aluminum holder has been machined to accommodate the rotating disk assembly; its purpose being to protect the Teflon sheath against deformation during the pressing process. After the press, the rotating disk assembly is removed from the electrode holder, and the excess lithium on the bottom end of the Teflon sheath is removed by polishing on a carborundum paper. The final product after the polishing is a circular lithium disk electrode imbedded on the bottom end of a cylindrical Teflon sheath. The entire unit can be mounted on a high-speed rotator for investigating the electrochemical reactions of the lithium batteries.

DESCRIPTION OF THE DRAWING

Referring to FIG. 1, the rotating lithium disk electrode includes a stainless steel core, 1; a cylindrical Teflon sheath, 2; a circular lithium disk electrode, 3; a self-tapping stainless steel screw, 4; to secure the lithium electrode and a steel spring, 5; to provide electric contact to the lithium electrode.

Referring to FIG. 2, the aluminum holder, 7 has a cavity, 8 for accommodating the rotating lithium disk assembly during the pressing process.

Figure 1:
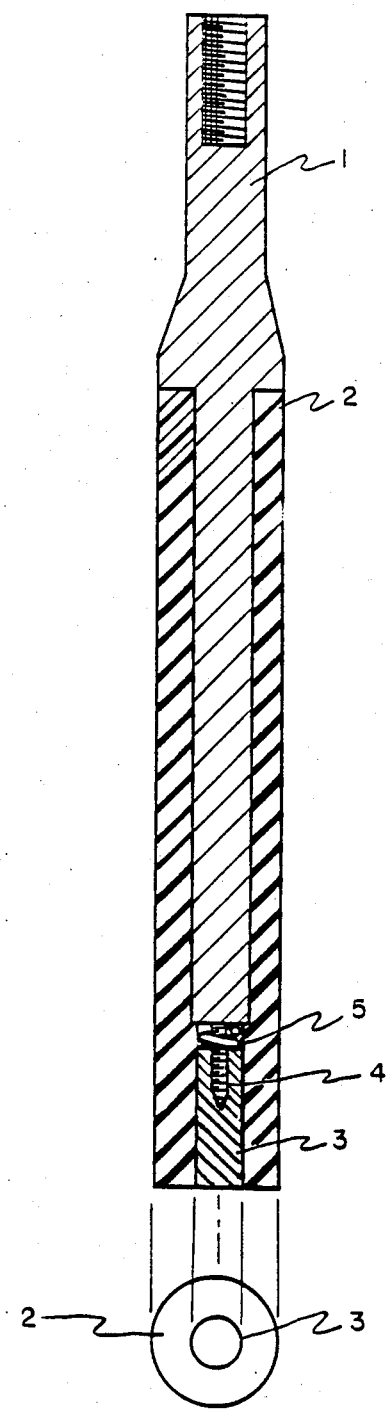
FIG. 1 is a schematic of a construction of a rotating lithium disk electrode according to the invention.
Figure 2:
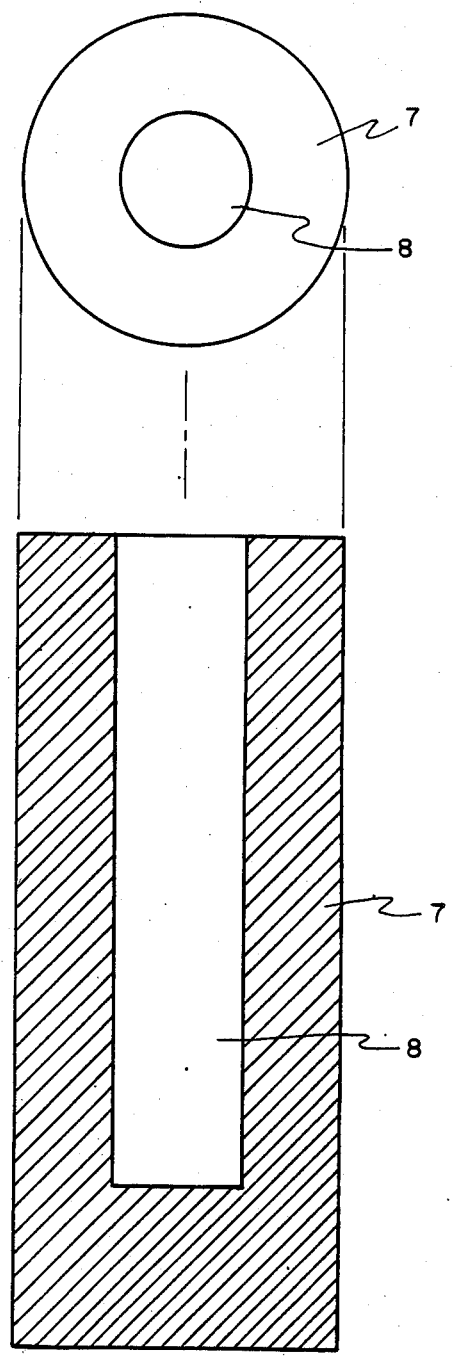
FIG. 2 is a schematic of an aluminum holder for accommodating the rotating lithium disk assembly during the pressing process.

The fabrication procedure first involves the machining of the stainless steel core, 1 and the tubular Teflon sheath, 2. The top end of the stainless steel core, 1 is machined to fit into the shaft of a high-speed rotator (not shown in the figure). The bottom end of the stainless steel core, 1 contains the self tapping screw, 4 and is pressure fitted into the Teflon sheath, 2 as shown in FIG. 1. The unit is then brought into a dry box having a dry and inert argon atmosphere. A short section of coiled steel spring, 5 is placed into the opening of the Teflon sheath, 2. A , lithium rod, 3 with its diameter slightly smaller than the inside diameter of the Teflon sheath, 2 and its length slightly longer than the depth of the opening, is inserted into the Teflon sheath, 2. The insertion process involves the rotation of the lithium rod, 3 to force the self-tapping screw, 4 to thread into the lithium rod, 3. The insertion process continues until the steel spring, 5 is sufficiently compressed against the stainless steel core, 1. The ohmic resistance between the stainless steel core, 1, and the inserted lithium rod, 3, is measured with a multimeter to ensure that a good electrical contact is provided to the rotating lithium disk electrode. After that, the bottom end of the Teflon sheath, 2, containing a small amount of excess lithium is placed into the cavity, 8 of an aluminum electrode holder, 7 shown in FIG. 2. The entire unit is then pressed axially until the lithium expands to completely fill the opening of the Teflon sheath, 2. The aluminum holder, 7 has been machined to accommodate the rotating disk assembly; its purpose is to protect the Teflon sheath, 2 against deformation during the pressing process. After the press, the rotating disk assembly is removed from the electrode holder, and the excess lithium on the bottom end of the Teflon sheath, 2 is removed by polishing on a carborundum paper. The final product after the polishing is a circular lithium disk electrode embedded on the bottom end of a tubular Teflon sheath, and the entire unit can be mounted on a high-speed rotator for investigating the electrochemical reaction of the lithium batteries.

I wish it to be understood that I do not desire to be limited to the exact details as described for obvious modifications will occur to a person skilled in the art.

What is claimed is:

1. Method of making a rotating disk electrode of a soft alkali metal reactive to oxygen and moisture in the air from a stainless steel core, a tubular Teflon sheath, a circular disk electrode of said soft alkali metal, a self-tapping stainless steel screw to secure said soft alkali electrode, and a steel spring to provide electric contact to said soft alkali metal electrode, said method including steps of:

(A) machining the top end of the stainless steel core to fit into the shaft of a high-speed rotator, (B) pressure fitting the bottom end of the stainless steel core containing the self-tapping screw into the Teflon sheath, (C) bringing the unit into a dry box having a dry and inert argon atmosphere, (D) placing a short section of coiled steel spring into the opening of the Teflon sheath, (E) inserting into the Teflon sheath a rod of the soft alkali metal with its diameter slightly smaller than the inside diameter of the Teflon sheath and its length slightly longer than the depth of the opening so that rotation of the rod of the soft alkali metal forces the self-tapping screw to thread into the rod of the soft alkali metal until the steel spring is sufficiently compressed against the stainless steel core, (F) measuring the ohmic resistance between the stainless steel core and the inserted rod of the soft alkali metal with a multimeter to ensure that a good electric contact is provided to the rotating disk electrode of the soft alkali metal, (G) placing the bottom end of the Teflon sheath containing a small amount of excess soft alkali metal into the cavity of an aluminum electrode holder and pressing the entire unit axially until the soft alkali metal expands to completely fill the opening of the Teflon sheath, and (H) removing the rotating disk assembly from the electrode holder, and removing the excess soft alkali metal on the bottom end of the Teflon sheath by polishing on a carborundum paper.

2. Method according to claim 1 wherein the soft alkali metal is selected from the group consisting of lithium and sodium.

3. Method according to claim 2 wherein the soft alkali metal is lithium.

4. Method according to claim 2 wherein the soft alkali metal is sodium.

* * * * *